United States Patent [19]

Haberer

[11] Patent Number: 5,044,114
[45] Date of Patent: Sep. 3, 1991

[54] INSECTICIDAL DEVICE FOR ANIMALS

[76] Inventor: Merle D. Haberer, 316 S. Elm, #7, Aberdeen, S. Dak. 57401

[21] Appl. No.: 416,115

[22] Filed: Oct. 2, 1989

[51] Int. Cl.⁵ .............................................. A01K 13/00
[52] U.S. Cl. ..................................... 43/132.1; 40/300; 119/156
[58] Field of Search ................... 43/137; 40/300, 303; 119/156

[56] References Cited

U.S. PATENT DOCUMENTS

| | | | |
|---|---|---|---|
| 444,963 | 1/1891 | Russell | 43/137 |
| 1,342,974 | 6/1920 | Smith | 43/137 |
| 1,509,489 | 9/1924 | Rochwite | 43/137 |
| 1,886,039 | 11/1932 | Miller | 43/137 |
| 3,428,221 | 2/1969 | Landsman et al. | 222/182 |
| 3,623,659 | 11/1971 | Malerson et al. | 239/56 |
| 3,698,974 | 10/1972 | Rabussier et al. | 156/87 |
| 3,747,260 | 7/1973 | Lovness | 43/131 |
| 3,778,924 | 12/1973 | Okui | 43/129 |
| 3,858,807 | 1/1975 | Rabussier et al. | 239/56 |
| 3,869,308 | 3/1975 | Graham | 117/126 |
| 3,931,692 | 1/1976 | Hermanson | 43/131 |
| 4,079,700 | 3/1978 | Eshnaur et al. | 119/159 |
| 4,091,766 | 5/1978 | Colliard | 40/300 |
| 4,103,450 | 8/1978 | Whitcomb | 43/131 |
| 4,120,115 | 10/1978 | Mushkin | 43/137 |
| 4,250,838 | 2/1981 | Ott | 119/156 |
| 4,350,122 | 9/1982 | Shotwell | 119/156 |
| 4,782,612 | 11/1988 | Eidmann et al. | 40/300 |
| 4,878,456 | 11/1989 | Howe | 119/156 |

*Primary Examiner*—Kurt Rowan
*Attorney, Agent, or Firm*—Kinney & Lange

[57] ABSTRACT

A device for repelling insects is attachable to the tail of an animal. The device includes a plurality of fibrous strands which are impregnated with an insecticide and includes a mechanism for attaching the strands to the tail of the animal.

17 Claims, 2 Drawing Sheets

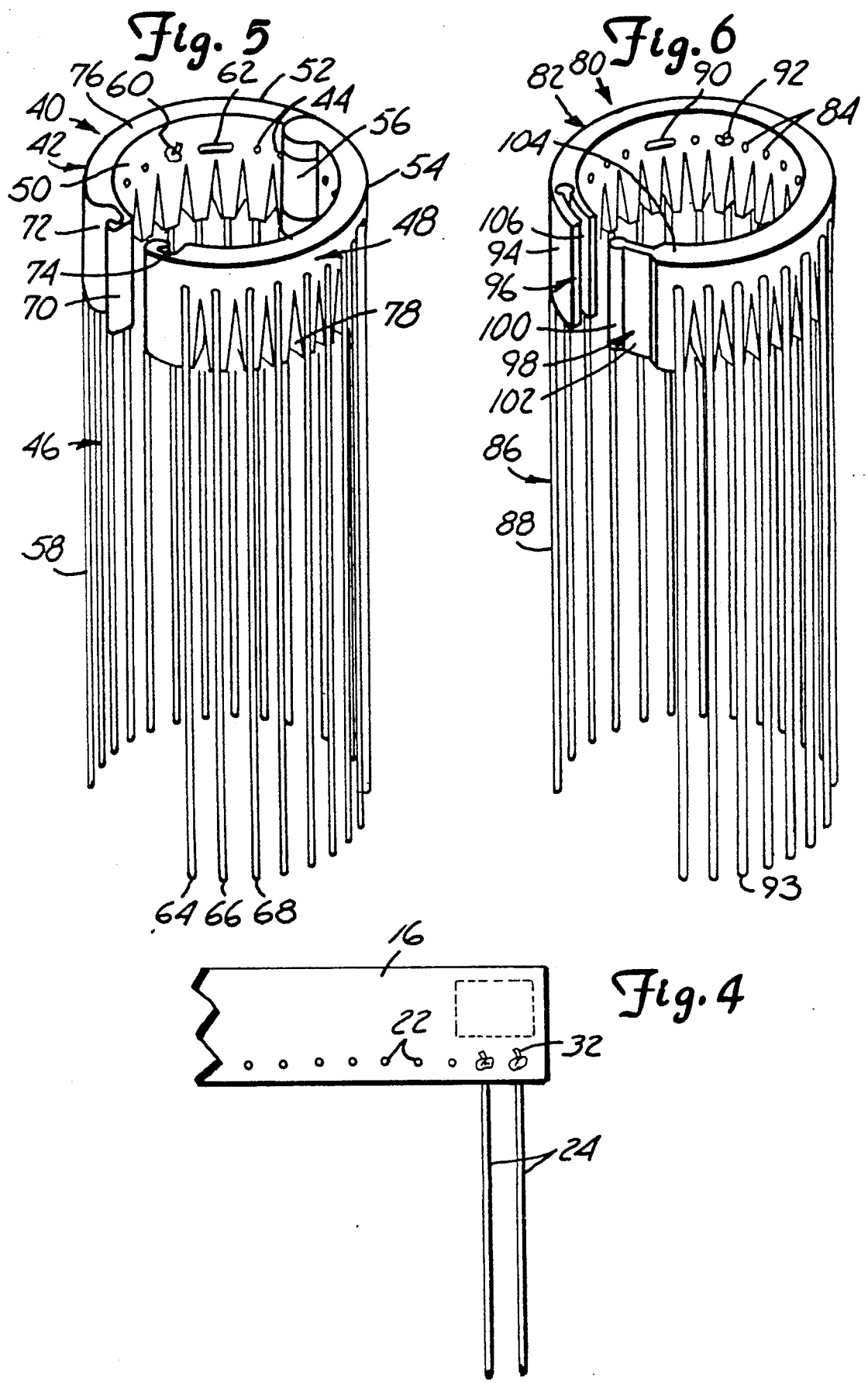

INSECTICIDAL DEVICE FOR ANIMALS

BACKGROUND OF THE INVENTION

1. Field of the Invention

The present invention relates to an insecticidal device that is attached to the tail of an animal.

2. Description of the Prior Art

Substantial resources have been expended to repel and destroy insects which injure livestock by pestering animals and by transmitting diseases. A device for dispensing an insecticidal powder used to destroy insects is described in the Eshnaur et al U.S. Pat. No. 4,079,700. The device, a dust bag, is hung in an area accessible to animals in such a manner that animals can brush against the bag and dust themselves with the insecticide powder.

Other patents relate to materials which repel and destroy insects but do not describe devices which specifically control livestock insect problems. Such patents include the Whitcomb U.S. Pat. No. 4,103,450, which describes an open, low density lofty web, impregnated with an insecticidal substance. The web ensnares insects that enter its maze. The insects may be killed by either a direct contact with insecticide or by insecticide vapors. Another device described by Hermanson U.S. Pat. No. 3,931,692 is an insect pad constructed to exterminate cockroaches. The invention includes poisoned food particles covered by a paper web having openings larger than the span of an insect's feelers and mouth parts.

An invention described by Graham in U.S. Pat. No. 3,869,308 includes a method of forming strands of glass fibers suitable for coating with a polymeric material, which may be used as an insect screening material. Another material as described by the Malerson U.S. Pat. No. 3,623,659 includes disposable paper products that are impregnated with encapsulated insect repellant. The capsules are dispersed in a fibrous web. An additional material, described by Landsman et al, U.S. Pat. No. 3,428,221 includes tape with an adhesive coating on one side. The absorbent strip is saturated with an insecticide. An apparatus for emitting vapors of a volatile insecticidal agent or other volatile product is described in the Rabussier et al U.S. Pat. No. 3,858,807. The apparatus includes one or more fibrous absorbing plates, a polymeric diffusion layer and a frame for containing the plates. The absorbing plate is saturated with a volatile insecticide, and the vapors are emitted at room temperature through the diffusion layer. A process for manufacturing the above-mentioned apparatus is described by Rabussier et al, U.S. Pat. No. 3,698,974.

Another apparatus for emitting insecticide vapors is described in the Okui U.S. Pat. No. 3,778,924. This apparatus includes a heating element, a liquified gas source and an electrical ignition. The heater vaporizes an insecticide impregnated in a fibrous material. The fumigator automatically shuts off the fuel supply when the device becomes overheated. The Lovness U.S. Pat. No. 3,749,260 describes a device which includes two spaced sheets of flexible material attached at the outer edges that enclose a sheet of fibrous material impregnated with a liquid insecticide. A small opening at the outer edge permits the passage of insects.

SUMMARY OF THE INVENTION

The present invention is a device for repelling insects that spread disease and that are a nuisance to animals. The device attaches to the tail of an animal. The insect repelling device includes a plurality of fibrous strands which are formed of either a synthetic or a natural material. The fibrous strands are attached to a band and impregnated with an insecticide. The insecticide is applied to the fibrous strands as either a volatile spray or in an encapsulated form. A closure device is attached to the band and holds the insect repelling device onto the tail of an animal. Closure devices which are usable include hook and loop-type fasteners, snap-type fasteners, and sliding lock-type fasteners.

BRIEF DESCRIPTION OF THE DRAWINGS

FIG. 4 is a plan view of another preferred embodiment of the present invention.

FIG. 5 is a perspective view of a snap-type coupling device of the present invention.

FIG. 6 is a perspective view of a sliding lock-type coupling device of the present invention.

DETAILED DESCRIPTION OF THE PREFERRED EMBODIMENTS

Figure 1:
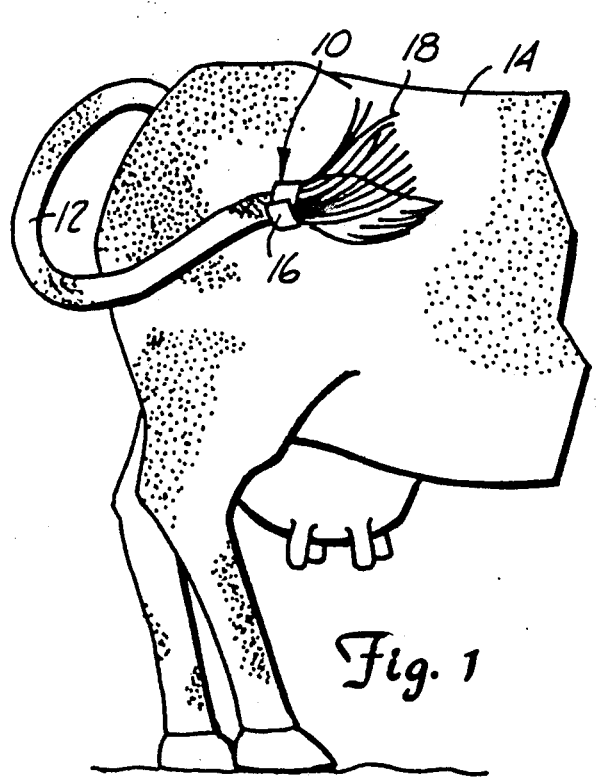
FIG. 1 is a perspective view of one embodiment of the present invention.

An insect repelling device of the present invention is shown generally at 10 in FIG. 1. The device 10 is fastened to the tail 12 of an animal 14. The device 10 has a collar 16 and a plurality of fibrous strands 18 that are attached to the collar 16. The strands 18 are impregnated with an insecticide. Insects flying or crawling near the insect repelling device 10 are exposed to insecticide vapors which emanate from the fibrous strands 18 of the device. The insect repelling device 10 moves with the tail 12 of the animal 14 and allows the animal to apply insecticide to body areas within reach of the tail 12 of the animal 14.

Figure 2:
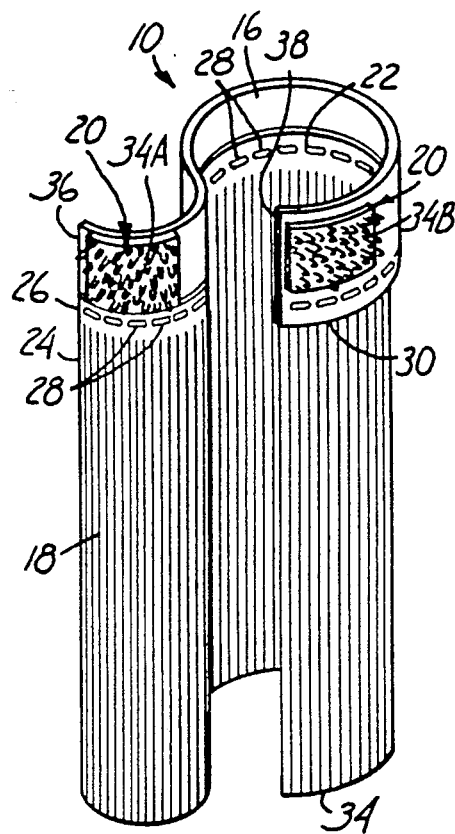
FIG. 2 is a perspective view of an embodiment of the present invention that includes a hook and loop fastening device.
Figure 3:
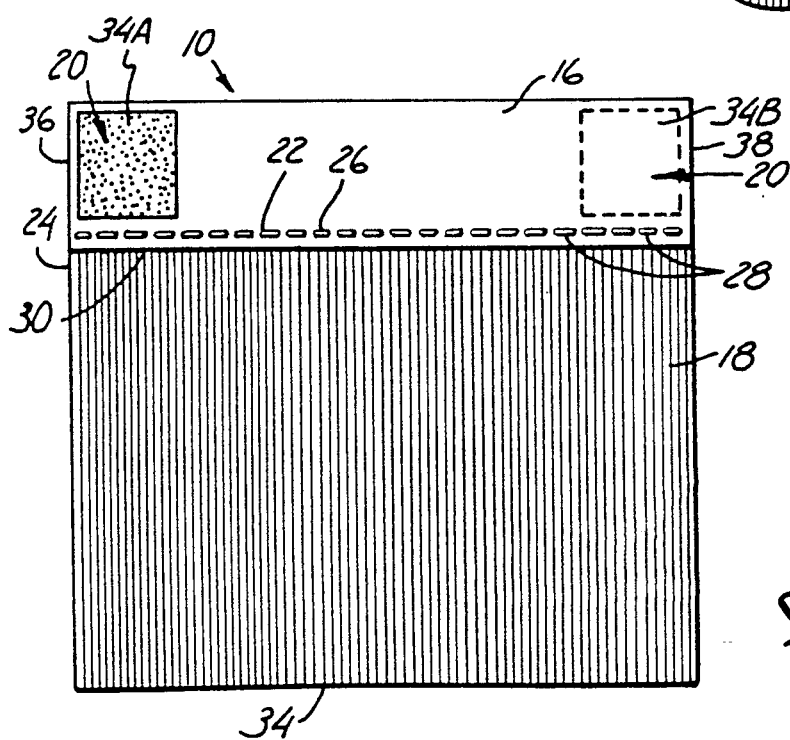
FIG. 3 is a plan view of an embodiment of the present invention which includes a hook and loop fastening device.

The insect repelling device 10 shown in FIGS. 2 and 3 includes a collar 16 attached to an array of aligned fibrous strands 18 which have been impregnated with an insecticide (not shown). The insect repelling device 10 is secured to the tail 12 of the animal 14, illustrated in FIG. 1, by a closure device 20 on the collar 16 as illustrated in FIG. 2 and in FIG. 3.

The collar 16 is flexible. In the preferred embodiment, the collar 16 is constructed of flexible polyethylene plastic. The collar 16 has a plurality of apertures 22 extending through the wall of the collar 16. In the preferred embodiment, a strand 24 of the array of aligned fibrous strands 18 is fastened to the collar 16 by threading the strand 24 through a pair of apertures 22 forming a stitch 26. A seam of stitches 28 extends along a lower edge 30 of the collar 16. In another embodiment, as shown in FIG. 4, the strand 24 is threaded through one aperture 22 terminating with a knot 32.

Each strand 24, as shown in FIGS. 2 and 3, of the array of aligned fibrous strands 18 includes a plurality of fibers which are joined together at the stitch 26. The plurality of fibers for the strand 24 may have sections where the fibers are aligned and bonded, sections where fibers are intertwined, and sections of random arrangement.

In the preferred embodiment, the strands 18 are constructed of nylon. In another embodiment, the strands 18 are constructed of cotton. Although nylon and cotton are the materials of construction of the strands 18 in the preferred embodiments, the present invention contemplates the use of other fibers which may be natural, synthetic, or natural and synthetic blends. The aligned fibrous strands 18 in the preferred embodiment are all of a uniform length. In one preferred embodiment, each strand 24 is between about 6 inches and about 8 inches long from the stitch 26 to the end 34 opposite the collar 16 of the insect repelling device 10 and is about ⅛ inch in diameter.

The plurality of fibers is coated with an insecticide coating on the external surfaces of the fibers. In the preferred embodiment, the fibers are coated with Vapona insecticide (DDVP, dimethyl dichlorovinyl phosphate). In another preferred embodiment, pyrethrum and pyrethrum derivatives such as pyretherm, pyrethrin and pyrenone are used to coat the fibers. Diazinon and malathion, as well as an encapsulated form of pyrethrum insecticide are other examples of insecticides that are suitable for use in the present invention.

Depending upon the insecticide used, an outside surface of a fibrous strand may have to be pretreated so that the insecticide adheres to the fibers.

The collar 16 in one preferred embodiment has a closure device 20 which includes a pair of hook and loop elements 34A and 34B attached to a flexible collar 16 for securing the insect repelling device 10 onto the tail 12 of the animal 14, illustrated in FIG. 1. The pair of hook and loop elements 34A, 34B in the preferred embodiment are "Velcro" hook and loop elements. The hook and loop elements 34A, 34B in the preferred embodiment are of rectangular configuration and are attached to the opposing ends 36 and 38 of the collar 16 of the insect repelling device 10.

When the collar 16 is flexed around the outer perimeter of the tail 12 of the animal 14 such that the hook element 34A meets the loop element 34B, the collar 16 is secured into position as illustrated in FIG. 1.

Another embodiment of the present invention is illustrated in FIG. 5 and includes a rigid collar 42 having a plurality of radial apertures 44 for attaching an array of fibrous strands 46. In the preferred embodiment, there are twenty-two radial apertures 44 and eleven strands 58. The radial apertures 44 are bored from the outer surface 48 of the collar 42 to the inner surface 50. The radial apertures 44 are evenly spaced around the collar 42 in the preferred embodiment. The rigid collar 42 also includes a pair of opposing hemispherical cylindrical sections 52 and 54 that are attached to each other at a hinge 56.

Each strand 58 of the array of fibrous strands 46 is threaded through a radial aperture 44 in the rigid collar 42. In one preferred embodiment, the strand 58 terminates at the collar end and is secured with a knot 60. In another embodiment, the strand 58 is threaded through a pair of radial apertures 44 forming a stitch 62. The strand 58 which is looped through a pair of radial apertures 44 has a first end 64 and a second end 66. Both the first end 64 and the second end 66 in the preferred embodiment terminates at the end 68 opposite the collar 42 of the insect repelling device 40. In the preferred embodiment, the array of fibrous strands 46 has a uniform length of between about 6 inches and about 8 inches as measured from the stitch 62 to the end 68 of the insect-repelling device 40.

A snap-type closure device 70 includes a pair of opposing clasping surfaces 72 and 74. Each hemispherical cylindrical section 52, 54 is pivotally attached with a hinge 56. As the first hemispherical cylindrical section 52 is rotated toward the second section 54 along the hinge 56, the pair of opposing clasping surfaces 72 and 74 engage and lock the collar 16 into place.

Each strand 58 of the array of aligned fibrous strands 46 includes a plurality of fibers which are joined together at the radial apertures 44 in the collar 42. The plurality of fibers for a strand 58 may have sections where the fibers are aligned and bonded, sections where fibers are intertwined, and sections of random arrangement. In the preferred embodiment, the strands 58 are constructed of nylon. In another embodiment, the strands 58 are constructed of cotton. Although nylon and cotton are the materials of construction of the strands 58 in the preferred embodiments, the present invention contemplates the use of other fibers which may be natural, synthetic, or natural and synthetic blends. The fibrous strands 58 in the preferred embodiment are all of a uniform length. In one preferred embodiment, each of the strands 58 is between about 6 inches and about 8 inches long and is about ⅛ inch in diameter.

The plurality of fibers includes an insecticide coating on the external surfaces of the fibers. In the preferred embodiment, the fibers are coated with Vapona insecticide (DDVP, dimethyl dichlorovinyl phosphate). In another preferred embodiment, pyrethrum and pyrethrum derivatives such as pyretherm, pyrethrin and pyrenone are used to coat the fibers. Diazinon and malathion, as well as an encapsulated form of pyrethrum insecticide are also suitable for use in the present invention.

Depending upon the insecticide used, an outside surface of a fibrous strand may have to be pretreated so that the insecticide adheres to the fibers (not shown).

The collar 42 in the preferred embodiment is of a rigid construction. In one preferred embodiment, the collar 42 is constructed of stainless steel. In another embodiment, the collar 16 is constructed of a suitable rigid plastic such as PVC (polyvinyl chloride). Although the preferred embodiment of the present invention is of metallic or plastic construction, the present invention contemplates the use of other rigid materials such as fiberglass or graphite impregnated plastic, for example.

The collar 42 in the preferred embodiment has an upper surface 76, and a lower surface 78 which are both substantially circular, having a centrally located cavity bisecting the circular surface. In the preferred embodiment, the upper surface 76 is substantially smooth, and the lower surface 78 is notched upwardly towards the upper surface 76. In another embodiment, the lower surface 78 is substantially smooth.

FIG. 6 illustrates an insect repelling device 80 having a collar 82 which is either flexible or rigid. The collar 82 has a plurality of radial apertures 84 for attaching an array of fibrous strands 86 to the collar 82. Each fibrous strand 88 in the preferred embodiment is looped through a pair radial apertures 84 forming a stitch 90. In another embodiment, each strand 88 is threaded through one radial aperture 84 terminating at a knot 92.

In this preferred embodiment, the array of fibrous strands 86 has a uniform length of between about 6 inches and about 8 inches from the stitch 90 to the end 93 of the insect-repelling device 80 opposite the collar 82.

A sliding lock-type closure 94 in one preferred embodiment of the present invention has a female end 96 and a male end 98. In the preferred embodiment, the male end 98 has a substantially cylindrical end 100 which is integrally attached to a neck portion 102. The neck portion 102 is affixed to the collar 82 at the end 104 of the collar 82. The neck portion 102 is tapered at the portion joining the end 104 in the preferred embodiment. The female end 96 has an aperture 106 of a shape and size to snugly receive the cylindrical end 100 and neck portion 102 of the end 104. The male end 98 snaps into the aperture 106 of the female end 96, holding the collar firmly in place.

The insect repellant device of the present invention, when attached to the tail of an animal, allows the animal to apply insecticide to areas reachable by movement of the tail 12 of the animal 14 (as illustrated in FIG. 1). The insecticide impregnated strands apply poison to insects which come into contact with the strands. Additionally, the insect repelling device emits insecticide vapors which are toxic to insects flying or crawling in the vicinity of the repelling device.

Although the present invention has been described with reference to preferred embodiments, workers skilled in the art will recognize that changes may be made in form and detail without departing from the spirit and scope of the invention.

What is claimed is:

1. A device attachable to a tail of an animal for repelling insects comprising:
    a plurality of fibrous strands impregnated with insecticide; and
    means for attaching the strands to the tail of the animal wherein the means for attaching the fibrous strands includes a rigid, hinged support band having a plurality of apertures.

2. The device of claim 1 wherein the plurality of fibrous strands is constructed of natural fibers.

3. The device of claim 2 wherein the natural fibers are cotton.

4. The device of claim 1 wherein the plurality of fibrous strands are constructed of synthetic fibers.

5. The device of claim 4 wherein the synthetic fibers are nylon.

6. A device attachable to a tail of an animal for repelling insects comprising:
    a plurality of fibrous strands impregnated with insecticide; and
    a rigid, hinged support band having a plurality of apertures for attaching the fibrous strands to the tail of an animal.

7. The device of claim 6 wherein the rigid, hinged support band includes a pair of interlocking surfaces.

8. A device attachable to a tail of an animal for repelling insects comprising:
    a plurality of fibrous strands impregnated with insecticide; and
    a flexible support band for attaching the fibrous strands to the tail of an animal wherein the flexible support band includes a plurality of apertures and wherein the fibrous strands are strung through the plurality of apertures.

9. The device of claim 8 wherein the plurality of fibrous strands is constructed of natural fibers.

10. The device of claim 9 wherein the natural fibers are cotton.

11. The device of claim 8 wherein the plurality of fibrous strands are constructed of synthetic fibers.

12. The device of claim 11 wherein the synthetic fibers are nylon.

13. A device attachable to a tail of an animal for repelling insects comprising:
    a plurality of fibrous strands impregnated with insecticide; and
    a flexible support band for attaching the fibrous strands to the tail of an animal wherein the flexible support band includes a cylindrical end surface integral with the support band and an integrally formed slotted aperture for receiving the cylindrical end.

14. The device of claim 13 wherein the plurality of fibrous strands is constructed of natural fibers.

15. The device of claim 14 wherein the natural fibers are cotton.

16. The device of claim 13 wherein the plurality of fibrous strands are constructed of synthetic fibers.

17. The device of claim 16 wherein the synthetic fibers are nylon.

* * * * *